US 9,190,922 B2

(12) United States Patent
Saito et al.

(10) Patent No.: US 9,190,922 B2
(45) Date of Patent: *Nov. 17, 2015

(54) POWER CONVERSION DEVICE

(75) Inventors: Masao Saito, Tokyo (JP); Takamasa Nakamura, Atsugi (JP); Kouji Yamamoto, Chigasaki (JP); Junichi Itoh, Nagaoka (JP); Yoshiya Ohnuma, Nagaoka (JP)

(73) Assignees: NISSAN MOTOR CO., LTD., Yokohama-shi (JP); NAGAOKA UNIVERSITY OF TECHNOLOGY, Nagaoka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/342,878

(22) PCT Filed: Sep. 6, 2012

(86) PCT No.: PCT/JP2012/072728
§ 371 (c)(1),
(2), (4) Date: Mar. 5, 2014

(87) PCT Pub. No.: WO2013/035781
PCT Pub. Date: Mar. 14, 2013

(65) Prior Publication Data
US 2014/0226386 A1    Aug. 14, 2014

(30) Foreign Application Priority Data

Sep. 6, 2011   (JP) .................................. 2011-194184

(51) Int. Cl.
*H02M 5/297* (2006.01)
*H02M 5/293* (2006.01)
*H02M 7/217* (2006.01)

(52) U.S. Cl.
CPC .............. *H02M 5/297* (2013.01); *H02M 5/293* (2013.01); *H02M 7/217* (2013.01)

(58) Field of Classification Search
CPC ............................... H02M 5/293; H02M 7/217

USPC ............................................................ 363/39
See application file for complete search history.

(56) References Cited

U.S. PATENT DOCUMENTS 5,519,311 A  * 5/1996 Widmayer .................... 323/319
5,889,667 A  * 3/1999 Bernet .......................... 363/127
(Continued)

FOREIGN PATENT DOCUMENTS

CN           101951168 A       1/2011
EP           1 708 350 A3      12/2008
(Continued)

OTHER PUBLICATIONS

U.S. Appl. No. 14/342,842, filed Mar. 5, 2014, Saito et al.
U.S. Appl. No. 14/342,858, filed Mar. 5, 2014, Saito et al.
Koji Kato et al., Development of a Novel Commutation Method Which Drastically Suppresses Commutation Failure of a Matrix Converter, Heisei 19 Electrical Engineering Society Paper, 2007, pp. 829-836, vol. 127, No. 8.
(Continued)

*Primary Examiner* — Timothy J Dole
*Assistant Examiner* — Bryan R Perez
(74) *Attorney, Agent, or Firm* — Foley & Lardner LLP

(57) ABSTRACT

An electric power conversion device comprises a conversion circuit having bi-directionally switchable plural pairs of switching elements connected to respective phases and converting an inputted AC power into an AC electric power. A first switching time is calculated using detected voltages detected by voltage sensors and an output command value. A second switching time is calculated in a form of a time which is a subtraction of the first switching time from a half period of a carrier and, using this time, control signals to switch on and off of the switching elements are generated.

4 Claims, 15 Drawing Sheets

(56) References Cited

U.S. PATENT DOCUMENTS

| | | |
|---|---|---|
| 6,330,170 B1 | 12/2001 | Wang et al. |
| 7,701,740 B2 * | 4/2010 | Yamanaka .................... 363/149 |
| 2003/0095424 A1 | 5/2003 | Oates |
| 2009/0231896 A1 * | 9/2009 | Barbosa et al. ............... 363/131 |
| 2009/0323380 A1 * | 12/2009 | Harrison ....................... 363/126 |
| 2014/0226382 A1 * | 8/2014 | Saito et al. .................... 363/124 |
| 2014/0233280 A1 * | 8/2014 | Saito et al. ...................... 363/37 |

FOREIGN PATENT DOCUMENTS

| | | | |
|---|---|---|---|
| JP | 02-131368 | A | 5/1990 |
| JP | 07-007944 | A | 1/1995 |
| JP | 08-107672 | A | 4/1996 |
| JP | 2000-299984 | A | 10/2000 |
| JP | 2001-298953 | A | 10/2001 |
| JP | 2003-528562 | A | 9/2003 |
| JP | 2006-020384 | A | 1/2006 |
| JP | 2006-246673 | A | 9/2006 |
| JP | 2010-263702 | A | 11/2010 |
| RU | 2 265 947 | C2 | 12/2005 |
| RU | 2 349 019 | C1 | 3/2009 |
| RU | 2 414 043 | C1 | 3/2011 |

OTHER PUBLICATIONS

Yoshiya Onuma et al., 50kVA, 125A Sanso Tanso Matrix Converter o Tekiyo Shita Koshuha Link AC-DC Converter no Jikki Kensho, Heisei 23 Nen National Convention Record, I.E.E. Japan, Industry Applications Society, Sep. 6, 2011, 1-80, pp. I-403 to I-406.

Young Li, "Direct Duty Ratio Pulse Width Modulation Method for Matrix Converters", *Chonnam National University*, 2009, 186 pgs.

Korean Office Action dated Jan. 21, 2015, 6 pgs.

M Saito, USPTO Non-final Office Action U.S. Appl. No. 14/342,858 dated Jan. 23, 2015, 16 pgs.

M. Saito, USPTO Non-final Office Action U.S. Appl. No. 14/342,842 dated Jan. 30, 2015, 15 pgs.

M. Saito, U.S. PTO Notice of Allowance, U.S. Appl. No/ 14/342,858, dated Jun. 2, 2015, 10 pages.

M. Saito, U.S. PTO Notice of Allowance, U.S. Appl. No. 14/342,842, dated Jun. 30, 2015, 10 pages.

Hara, H. et al., "Improvement of output voltage control performance for low speed operation of matrix converter", *2004 35th Annual IEEE Power Electronics Specialists Conference*, Aachen, Germany, Jun. 20-25, 2004, pp. 2910-2916.

* cited by examiner

FIG.8

| AREA | STATE | V | $S_{rp}$ | $S_{rn}$ | $S_{sp}$ | $S_{sn}$ | $S_{tp}$ | $S_{tn}$ |
|---|---|---|---|---|---|---|---|---|
| AREA 1 | (1) | $V_1$ | 1 | 0 | 0 | 0 | 0 | 1 |
| | (2) | $V_2$ | 0 | 0 | 1 | 0 | 0 | 1 |
| | (3) | $V_8$ | 0 | 0 | 1 | 1 | 0 | 0 |
| | (4) | $V_5$ | 0 | 0 | 0 | 1 | 1 | 0 |
| | (5) | $V_4$ | 0 | 1 | 0 | 0 | 1 | 0 |
| | (6) | $V_7$ | 1 | 1 | 0 | 0 | 0 | 0 |
| AREA 2 | (1) | $V_2$ | 0 | 0 | 1 | 0 | 1 | 1 |
| | (2) | $V_3$ | 0 | 1 | 1 | 0 | 0 | 0 |
| | (3) | $V_7$ | 1 | 1 | 0 | 0 | 0 | 0 |
| | (4) | $V_6$ | 1 | 0 | 0 | 1 | 0 | 0 |
| | (5) | $V_5$ | 0 | 0 | 0 | 1 | 1 | 0 |
| | (6) | $V_9$ | 0 | 0 | 0 | 1 | 1 | 1 |
| AREA 3 | (1) | $V_3$ | 0 | 1 | 1 | 0 | 0 | 0 |
| | (2) | $V_4$ | 0 | 1 | 0 | 0 | 1 | 0 |
| | (3) | $V_9$ | 0 | 0 | 0 | 0 | 1 | 0 |
| | (4) | $V_1$ | 1 | 0 | 0 | 0 | 1 | 1 |
| | (5) | $V_6$ | 1 | 0 | 0 | 0 | 0 | 0 |
| | (6) | $V_8$ | 0 | 0 | 1 | 1 | 0 | 0 |
| AREA 4 | (1) | $V_4$ | 0 | 1 | 0 | 0 | 1 | 0 |
| | (2) | $V_5$ | 0 | 0 | 0 | 1 | 1 | 0 |
| | (3) | $V_8$ | 0 | 0 | 1 | 1 | 0 | 0 |
| | (4) | $V_2$ | 0 | 0 | 1 | 0 | 0 | 1 |
| | (5) | $V_1$ | 1 | 0 | 0 | 0 | 0 | 1 |
| | (6) | $V_7$ | 1 | 1 | 0 | 0 | 0 | 0 |
| AREA 5 | (1) | $V_5$ | 0 | 0 | 0 | 1 | 1 | 0 |
| | (2) | $V_6$ | 1 | 0 | 0 | 1 | 0 | 0 |
| | (3) | $V_7$ | 1 | 1 | 0 | 0 | 0 | 0 |
| | (4) | $V_3$ | 0 | 1 | 1 | 0 | 0 | 0 |
| | (5) | $V_2$ | 0 | 0 | 1 | 0 | 0 | 1 |
| | (6) | $V_9$ | 0 | 0 | 0 | 1 | 1 | 1 |
| AREA 6 | (1) | $V_6$ | 1 | 0 | 0 | 0 | 0 | 0 |
| | (2) | $V_1$ | 1 | 0 | 0 | 0 | 1 | 1 |
| | (3) | $V_9$ | 0 | 0 | 0 | 0 | 0 | 0 |
| | (4) | $V_4$ | 0 | 1 | 0 | 0 | 1 | 1 |
| | (5) | $V_3$ | 0 | 1 | 1 | 0 | 0 | 0 |
| | (6) | $V_8$ | 0 | 0 | 1 | 1 | 0 | 0 |

POWER CONVERSION DEVICE

TECHNICAL FIELD

The present invention relates to an electric power conversion device.

BACKGROUND ART

A control apparatus for controlling an electric power converter is known which comprises: a PWM rectifier which performs a conversion of an alternating current to a direct current; and an inverter connected to the PWM rectifier to perform an inversion of the direct current to the alternating current, the control apparatus including: bi-phase modulation means for generating an output voltage command to perform a bi-phase modulation for the inverter; first compensation quantity calculating means for calculating a compensation quantity correcting the output voltage command in order to compensate for an output voltage error generated when the bi-phase modulation for the inverter is carried out; inverter PWM pattern generating means for generating PWM pulses for semiconductor switching elements of the PWM rectifier on a basis of an input current command; switching detecting means for detecting a presence or absence of a switching of the PWM rectifier; voltage magnitude detecting means for detecting a voltage of a maximum phase, a voltage of a middle phase, and a voltage of a minimum phase from an input voltage of each phase; and polarity determination means for determining a polarity of a load current, wherein the first compensation quantity calculating means calculates the compensation quantity correcting the output voltage command using an output of the voltage magnitude detecting means, an output of the polarity determination means, an output of the switching detecting means, a switching frequency of the inverter, and a dead time.

However, such a problem occurs that the known control apparatus for the electric power conversion device compensates only a voltage error generated according to a commutation but cannot prevent a commutation failure itself.

PRE-PUBLISHED DOCUMENT

Patent Document 1: Japanese Patent Application First Publication (tokkai) No. 2006-20384.

DISCLOSURE OF THE INVENTION

It is an object of the present invention to provide an electric power conversion device which can prevent the commutation failure.

The above-described object can be achieved by the present invention such that a switching time calculating section and a control signal generating section which generates control signals of switching elements on a basis of a first switching time and a second switching time are provided, the switching time calculating section calculating the first switching time during which one of the switching elements of an upper arm circuit of plural pairs of switching elements included in one phase from among the respective phases is turned on, the other switching elements of the upper arm circuit of the plural pairs of switching elements included in the other phases are turned off, at least one switching element of a lower arm circuit of the plural pairs of switching elements included in the other phases is turned on, and the other switching elements of the lower arm circuit of the plural pairs of switching elements included in the one phase are turned off using the detected voltages detected by voltage detecting means and an output command value and calculating the second switching time during which the plural pairs of switching elements included in the one phase from among the respective phases are turned on and the plural pairs of switching elements included in the other phases from among the respective phases are turned off in a form of a time which is a subtraction of the first switching time from a time corresponding to a half period of a carrier.

According to the present invention, an interval between a switching operation at a first time point of the second switching time and the switching operation at a last time point of the second switching time is secured. Therefore, an overlap of the switching operations at the first time point and the last time point is avoided. Consequently, the commutation failure can be prevented from occurring.

BRIEF DESCRIPTION OF THE DRAWINGS

FIG. 8 is a conceptual diagram of the switching pattern table of FIG. 4.

EMBODIMENTS FOR CARRYING OUT THE INVENTION

Hereinafter, a preferred embodiment according to the present invention will be described on a basis of drawings.

First Preferred Embodiment

Figure 1:
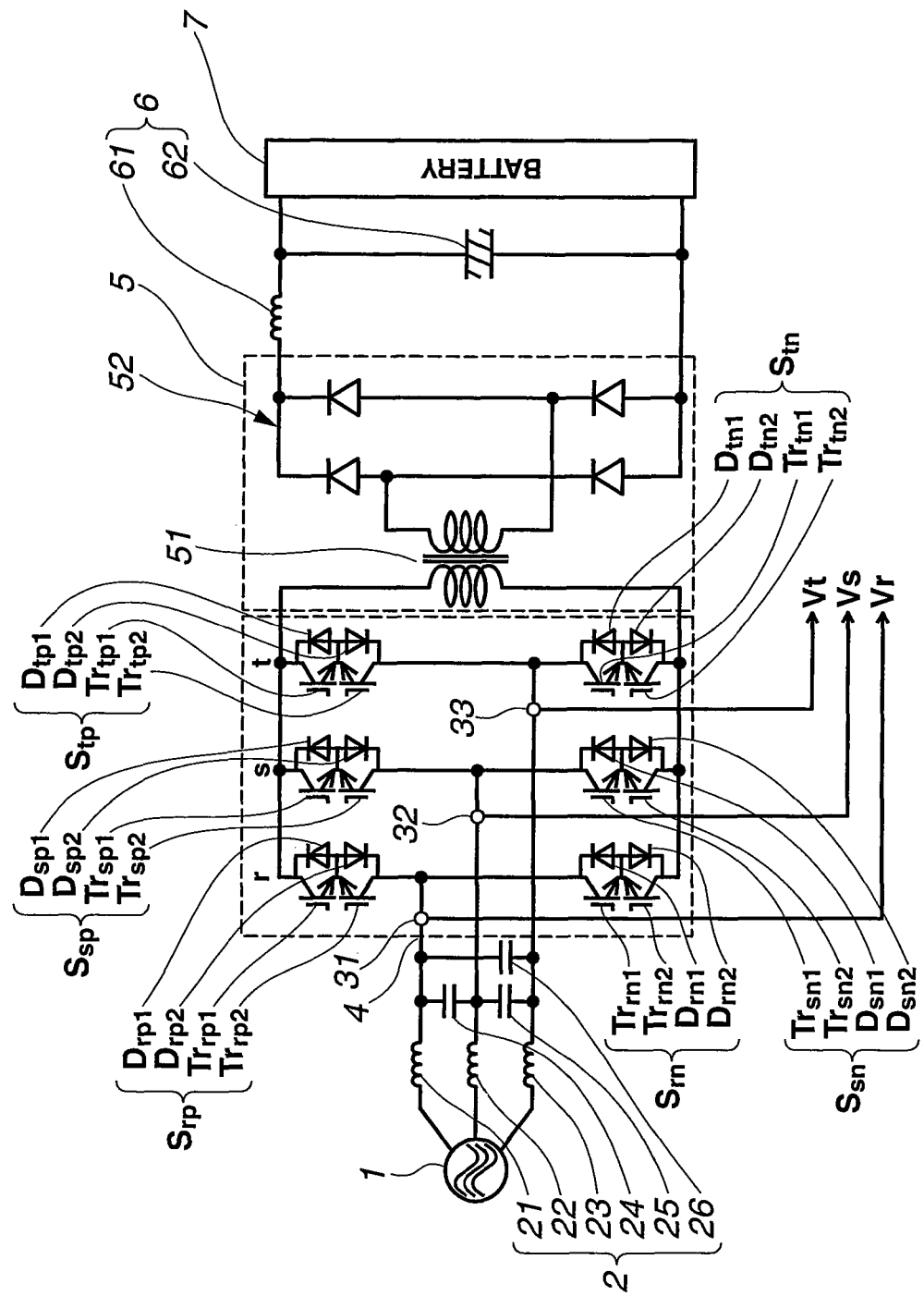
FIG. 1 is a block diagram of a charging system including an electric power conversion device in a preferred embodiment according to the present invention.

FIG. 1 is a block diagram of a battery system including an electric power conversion device related to a preferred embodiment according to the present invention. Hereinafter, a case in which the electric power conversion device in this embodiment is applied to a charging system is explained as an example but this embodiment may be applied to a vehicle or so forth including a motor and a control apparatus controlling the motor or so forth.

The charging system in this embodiment includes: an alternating current power supply 1; an input filter 2; voltage sensors 31~33; a matrix converter 4; a high frequency transformer circuit 5; an output filter 6; and a battery 7.

Alternating current power supply 1 is a three-phase alternating current power supply and provides an electric power source for the charging system. Input filter 2 is a filter for rectifying an alternating current electric power inputted from alternating current power supply 1 and is constituted by LC circuits having coils 21, 22, 23 and capacitors 24, 25, 26. Coils 21, 22, 23 are connected between respective phases of alternating current power supply 1 and of a matrix converter 4. Capacitors 24, 25, 26 are connected between coils 21, 22, 23 and are connected between the respective phases.

Voltage sensors 31, 32, 33 are connected between alternating current power supply 1 and matrix converter 4 to detect an input voltage ($V_r$, $V_s$, $V_t$) of each phase from alternating current power supply 1 to matrix converter 4 and outputs the detected voltages to a controller 10 as will be described later. Voltage sensor 31 is connected to a middle point of an r phase of matrix converter 4, voltage sensor 32 is connected to a middle point of an s phase of matrix converter 4, and voltage sensor 33 is connected to a middle point of a t phase of matrix converter 4.

Matrix converter 4 is provided with a plurality of switching elements $S_{rp}$, $S_{rn}$, $S_{sp}$, $S_{sn}$, $S_{tp}$, $S_{tn}$ bi-directionally switchable, converts the alternating current electric power inputted from alternating current power supply 1 into a high frequency alternating current electric power, and outputs the high frequency alternating current electric power to high frequency transformer circuit 5. Matrix converter 4 is connected between input filter 2 and high frequency transformer circuit 5. Switching element $S_{rp}$, in order to provide the element bi-directionally switchable, includes: transistor $Tr_{rp1}$ such as a MOSFET or IGBT; transistor $Tr_{rp2}$ such as the MOSFET or IGBT; a diode $D_{rp1}$; and diode $D_{rp2}$. Transistor $Tr_{rp1}$ and transistor $Tr_{rp2}$ are serially connected to each other in mutually opposite directions and diode $D_{rp1}$ and diode $D_{rp2}$ are serially connected to each other in mutually opposite directions, transistor $T_{rp1}$ and diode $D_{rp1}$ are connected in parallel to each other in mutually opposite directions, transistor $Tr_{rp2}$ and diode $D_{rp2}$ are connected in parallel to each other in mutually opposite directions. Similarly, other switching elements $S_{rn}$, $S_{sp}$, $S_{sn}$, $S_{tp}$, $S_{tn}$ are constituted by a bridge circuit of transistors $Tr_{rn1}$, $Tr_{rn2}$ and diodes $D_{rn1}$, $D_{rn2}$, a bridge circuit of transistors $Tr_{sp1}$, $Tr_{sp2}$ and diodes $D_{sp1}$, $D_{sp2}$, a bridge circuit of transistors $Tr_{sn1}$, $Tr_{sn2}$ and diodes $D_{sn1}$, $D_{sn2}$, a bridge circuit of transistors $Tr_{tp1}$, $Tr_{tp2}$ and diodes $D_{tp1}$, $D_{tp2}$, and a bridge circuit of transistors $Tr_{tn1}$, $Tr_{tn2}$ and diodes $D_{tn1}$, $D_{tn2}$.

That is to say, three of a pair of circuits in which two switching elements $S_{rp}$, $S_{rn}$, $S_{sp}$, $S_{sn}$, $S_{tp}$, $S_{tn}$ are serially connected are connected in parallel to a primary side of a, transformer 51. Then, a bridge circuit in which three lines connected between the respective pairs of switching elements $S_{rp}$, $S_{rn}$, $S_{sp}$, $S_{sn}$, $S_{tp}$, $S_{tn}$ are electrically connected to three phase output sections of alternating current power supply 1 constitutes three-phase-to-single-phase matrix converter 4.

High-frequency transformer circuit 5 is provided with transformer 51 and a rectifying bridge circuit 52 and is connected between matrix converter 4 and output filter 6. High-frequency transformer circuit 5 converts the high-frequency alternating current electric power inputted from matrix converter 4 into a direct current electric power and supplies the direct current electric power to a battery 7 via output filter 6. Transformer 51 boosts the high-frequency alternating current voltage inputted from matrix converter 4 and outputs this boosted alternating current to rectifying bridge circuit 52. It should be noted that, since the alternating current electric power outputted from matrix converter 4 is the high frequency, a small sized transformer can be used as transformer 51. Rectifying bridge circuit 52 is a circuit in which a plurality of diodes are connected in a bridge configuration and serves to convert a secondary side alternating current of transformer 51 into the direct current.

Output filter 6 is constituted by an LC circuit of a coil 61 and a capacitor 62 and is connected between high-frequency transformer circuit 5 and battery 7. Output filter 6 rectifies the direct current electric power outputted from high frequency transformer circuit 5 and supplies the direct current electric power to battery 7. Battery 7 is a secondary cell charged by the charging system in this embodiment and is constituted by, for example, an lithium-ion rechargeable battery. Battery 7 is, for example, mounted in the vehicle and provides a dynamical (power) source of the vehicle.

Thus, the charging system in this embodiment converts the alternating current from alternating current power supply 1 into the high-frequency alternating current, boosts the high-frequency alternating current through high frequency transformer circuit 5, converts the boosted alternating current into the direct current, and supplies the boosted high-voltage direct current electric power to battery 7.

Figure 2:
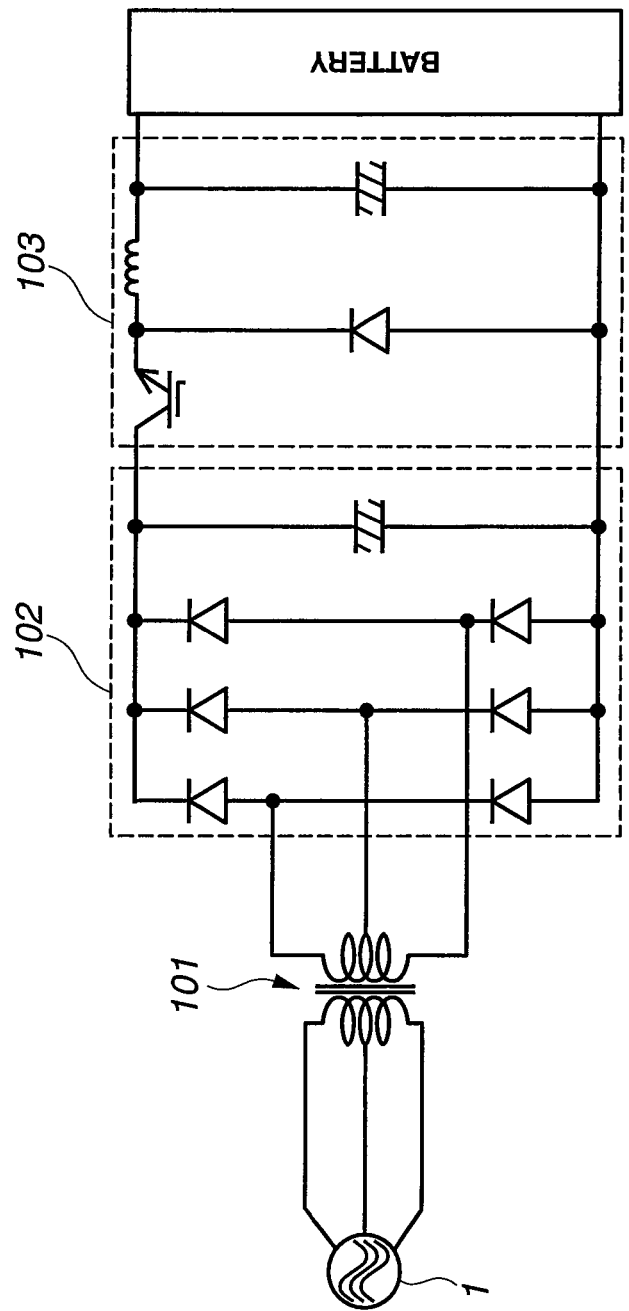
FIG. 2 is a block diagram of a charging system in a first comparative example.

Features of the charging system shown in FIG. 1 using the electric power conversion device in this embodiment will be explained while comparing with a comparative example 1 and another comparative example 2 described below. FIG. 2 shows a block diagram of the charging system related to comparative example 1 and FIG. 3 shows a block diagram of the charging system related to comparative example 2.

As the charging system different from the preferred embodiment according to the present invention, such a system, as shown in FIG. 2, that the alternating current electric power supplied from alternating current power supply 1 is passed through a transformer 101 and is converted into the direct current electric power through a rectifier 102 is known (comparative example 1).

Figure 3:
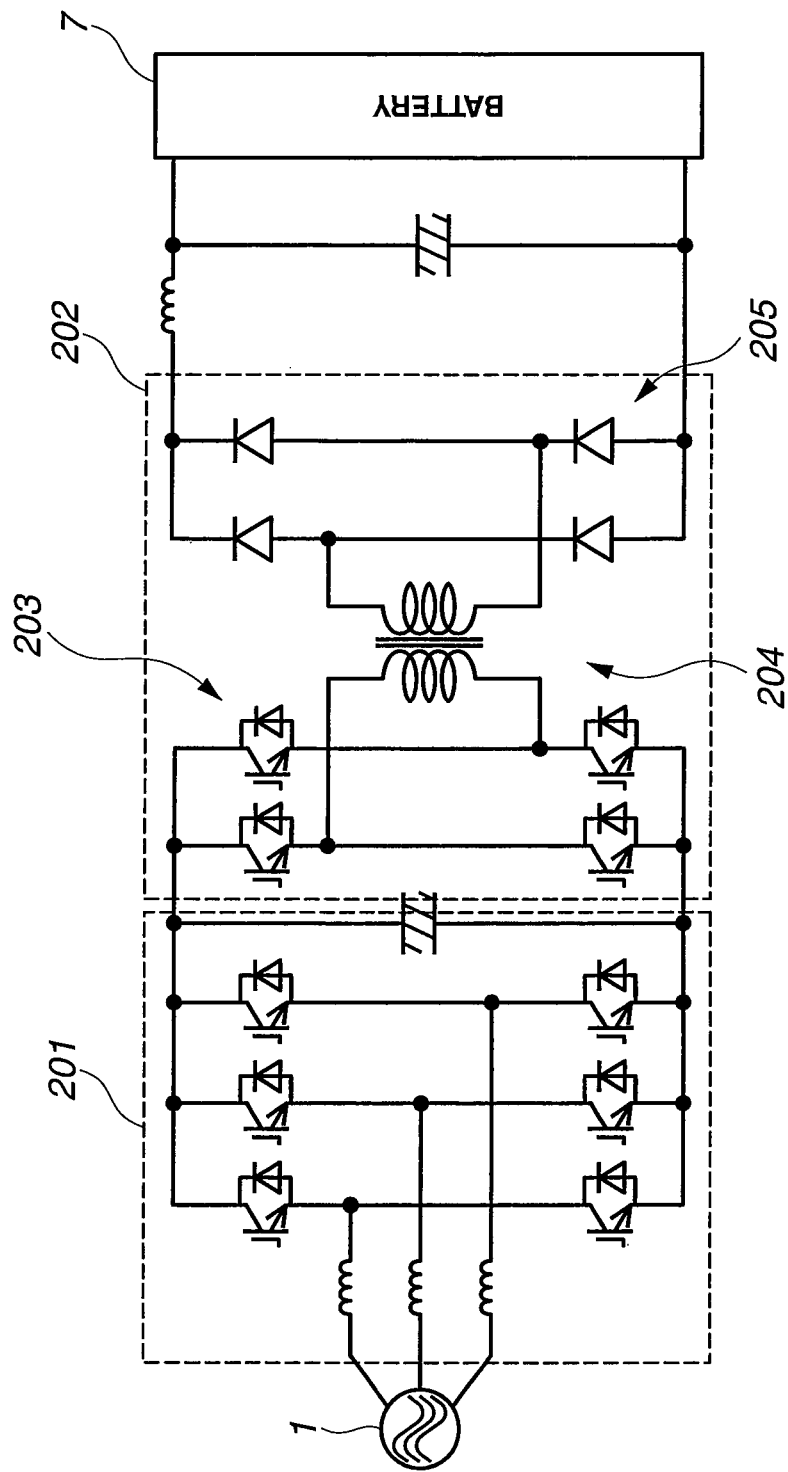
FIG. 3 is a block diagram of a charging system in a second comparative example.

In addition, as another charging system different from the charging system in this embodiment, such a system, as shown in FIG. 3, that the alternating current from alternating current power supply 1 is converted into the direct current through a PWM rectifier 201, the direct current is inverted into the alternating current through an inverter circuit 203 of a primary side of high frequency transformer circuit 202, the converted alternating current is boosted by means of a transformer 204, the boosted alternating current is converted into the direct current through a rectifying bridge circuit 205 of high-frequency transformer circuit 202, and the direct current is supplied to battery 7 is known (comparative example 2).

In a case of comparative example 1, a circuit structure is simple but transformer 101 becomes a large size. In addition, there is a problem such that it becomes necessary to connect a large capacity electrolyte capacitor between rectifier 102 and voltage boosting chopper 103. In a case of comparative example 2, although a small sized transformer can be used as transformer 204, a loss becomes large since a number of times of conversions are many. In addition, there is a problem such that it is necessary to connect a large capacity electrolyte capacitor between PWM rectifier 201 and high-frequency transformer 202.

In this embodiment, since, as described above, a use of matrix converter 4 can reduce the loss caused by the electric power conversion, can make the large capacity electrolyte capacitor at the primary side of transformer 51 unnecessary, and can achieve the small sizing of transformer 51.

Figure 4:
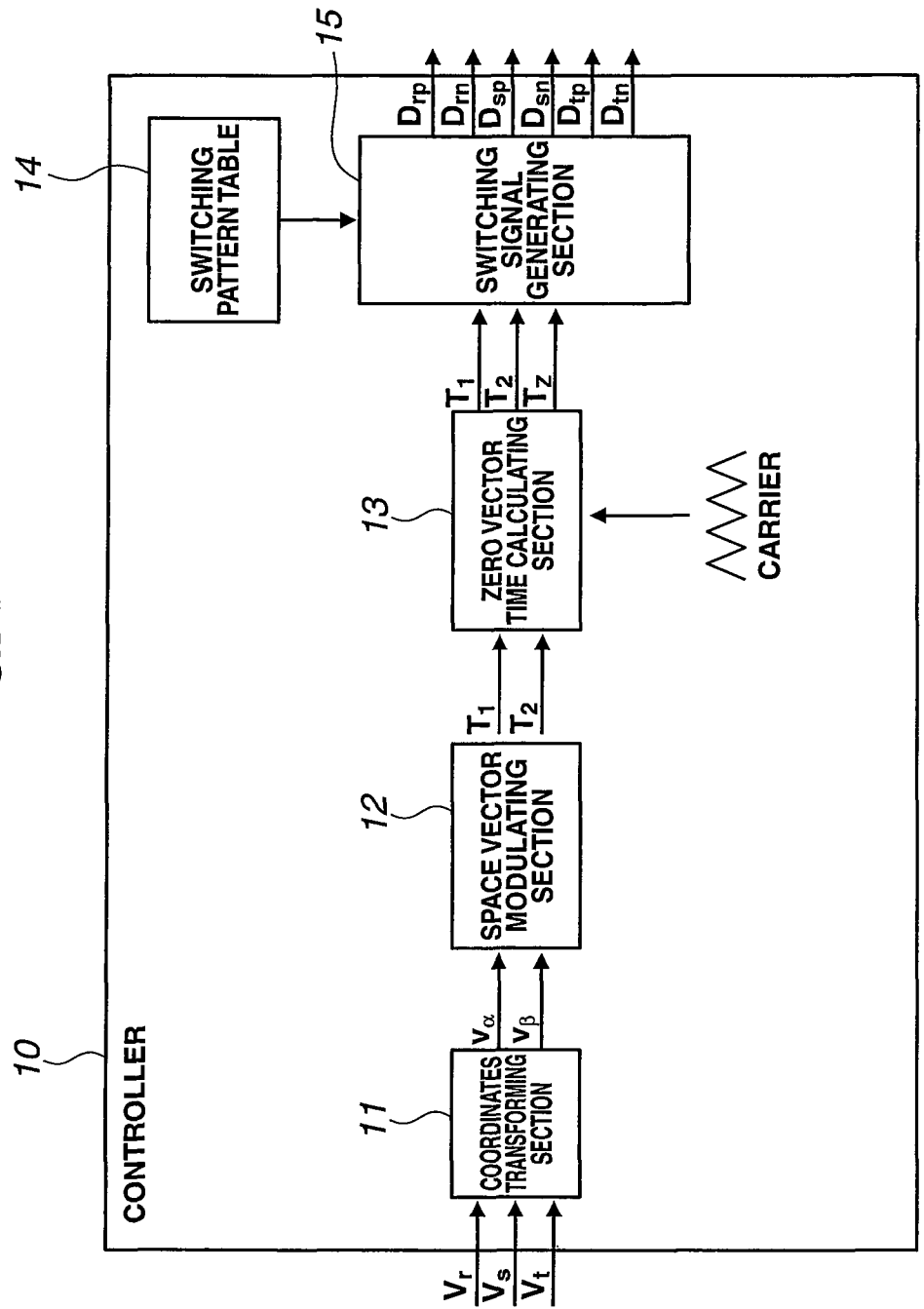
FIG. 4 is a block diagram of a controller controlling the electric power conversion device shown in FIG. 1.

Next, controller 10 controlling matrix converter 4 included in the electric power conversion device in this embodiment will be explained below with reference to FIG. 4. FIG. 4 shows a block diagram of controller 10. Controller 10 switches on and off of switching elements $S_{rp}$, $S_{rn}$, $S_{sp}$, $S_{sn}$, $S_{tp}$, $S_{tn}$ and controls matrix converter 4 through a PWM control. Controller 10 includes: a coordinates transforming section 11; a space vector modulating section 12; a zero vector time calculating section 13; a switching pattern table 14; and a switching signal generating section 15.

Coordinates transforming section 11 compares detected voltages detected by means of voltage sensors 31, 32, 33, grasps a magnitude relationship therebetween, performs a three-phase to two-phase conversion for detected voltages $(V_r, V_s, V_t)$ in a fixed coordinates system to be converted into voltages $(v_\alpha, v_\beta)$ in a static coordinates system, and outputs voltages $(v_\alpha, v_\beta)$ to space vector modulating section 12. Space vector modulation section 12 replaces three phase voltage waveforms into a vector utilizing a space vector modulation. Thus, output times $(T_1, T_2)$ of the voltage vectors are calculated utilizing a phase angle ($\theta$) of voltages $(v_\alpha, v_\beta)$.

Zero vector time calculating section 13 calculates an output time $(T_z)$ of zero vector using a carrier signal such as a triangular wave and the time calculated by space vector modulating section 12. A frequency of the carrier signal is set to be higher than a frequency of the alternating current electric power of alternating current power supply 1. A switching pattern table 14 stores a switching pattern preset to perform switching of switching elements $S_{rp}$, $S_{rn}$, $S_{sp}$, $S_{sn}$, $S_{tp}$, $S_{tn}$ corresponding phase angle ($\theta$) in a form of a table.

Switching signal generating section 15 extracts the switching pattern corresponding to the phase angle ($\theta$) by referring to switching pattern table 14 and outputs control signals ($D_{rp}$, $D_{rn}$, $D_{sp}$, $D_{sn}$, $D_{tp}$, $D_{tn}$) to switch on or off of switching elements ($S_{rp}$, $S_{rn}$, $S_{sp}$, $S_{sn}$, $S_{ep}$, $S_{tn}$) using the extracted switching pattern, output time ($T_1$, $T_2$) of the voltage vector, and output time ($T_z$) of the zero vector to a drive circuit (not shown) included in matrix converter 4. Switching elements $S_{rp}$, $S_{rn}$, $S_{sp}$, $S_{sn}$, $S_{tp}$, $S_{tn}$ are controlled by pulse signals. Thus, on and off of switching elements $S_{rp}$, $S_{rn}$, $S_{sp}$, $S_{sn}$, $S_{tp}$, $S_{tn}$ included in matrix converter 4 are switched to turn on and off by means of the control of controller 10 and the electric power is converted.

Figure 5:
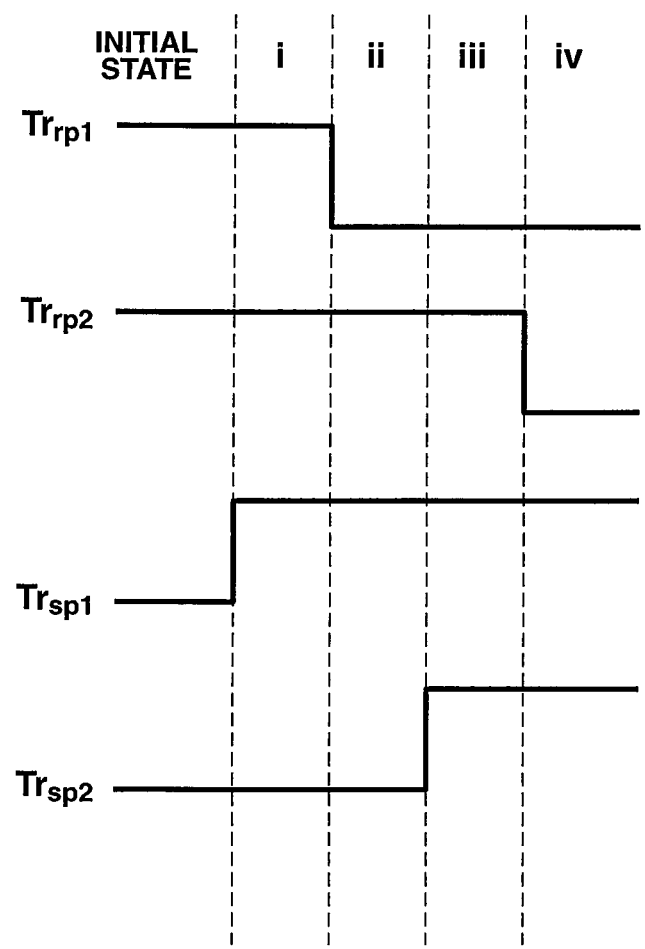
FIG. 5 is a graph representing a switching sequence of an r phase switching element shown in FIG. 1.

Next, a switching control of switching elements $S_{rp}$, $S_{rn}$, $S_{sp}$, $S_{sn}$, $S_{tp}$, $S_{tn}$ will be described using FIG. 5. FIG. 5 shows a graph representing a sequence of the switching to switching elements $S_{rp}$, $S_{rn}$, $S_{sp}$, $S_{sn}$, $S_{tp}$, $S_{tn}$. In FIG. 5, a high level denotes an on state and a low level denotes an off state. A voltage commutation system (method) is used for the switching of switching elements $S_{rp}$, $S_{rn}$, $S_{sp}$, $S_{sn}$, $S_{tp}$, $S_{tn}$. Controller 10 monitors a magnitude relationship of input voltages from detected voltages $(V_r, V_s, V_t)$ to perform the commutation. Suppose that the state of $Tr_{rp1}$, $Tr_{rp2}$, $Tr_{sp1}$, $Tr_{sp2}$ are transited from an initial state in a sequence of i, ii, iii, and iv.

Hereinafter, a specific example of the voltage commutation system (method) will be described below.

For simplicity of explanation, only the commutation control for an upper arm circuit of matrix converter 4 will be described below.

Suppose that transistors $Tr_{rp1}$, $Tr_{rp2}$ included in switching element $S_{rp}$ are in an on state and transistors $Tr_{sp1}$, $Tr_{sp2}$ included in switching element $S_{sp}$ are in an off state. Then, a case in which, in a state in which the voltage of switching element $S_{rp}$ is higher than the voltage of switching element $S_{sp}$, the commutation is performed from switching element $S_{rp}$ to the voltage to switching element $S_{sp}$ will be explained below.

First, when the state is transited from the initial state to state (i), transistor $Tr_{sp1}$ is turned on, when the state is transited from state (i) to state (ii), transistor $Tr_{rp1}$ is turned off, when the state is transited from state (ii) to state (iii), transistor $Tr_{sp2}$ is turned on, and when the state is transited from state (iii) to state (iv), transistor $Tr_{rp2}$ is turned off. This causes the switching of the switching elements such that alternating current power supply 1 is not short-circuited. Thus, a commutation failure is suppressed.

Next, the control in controller 10 will be described below using FIGS. 1, 4, and 6 through 12.

Figure 6:
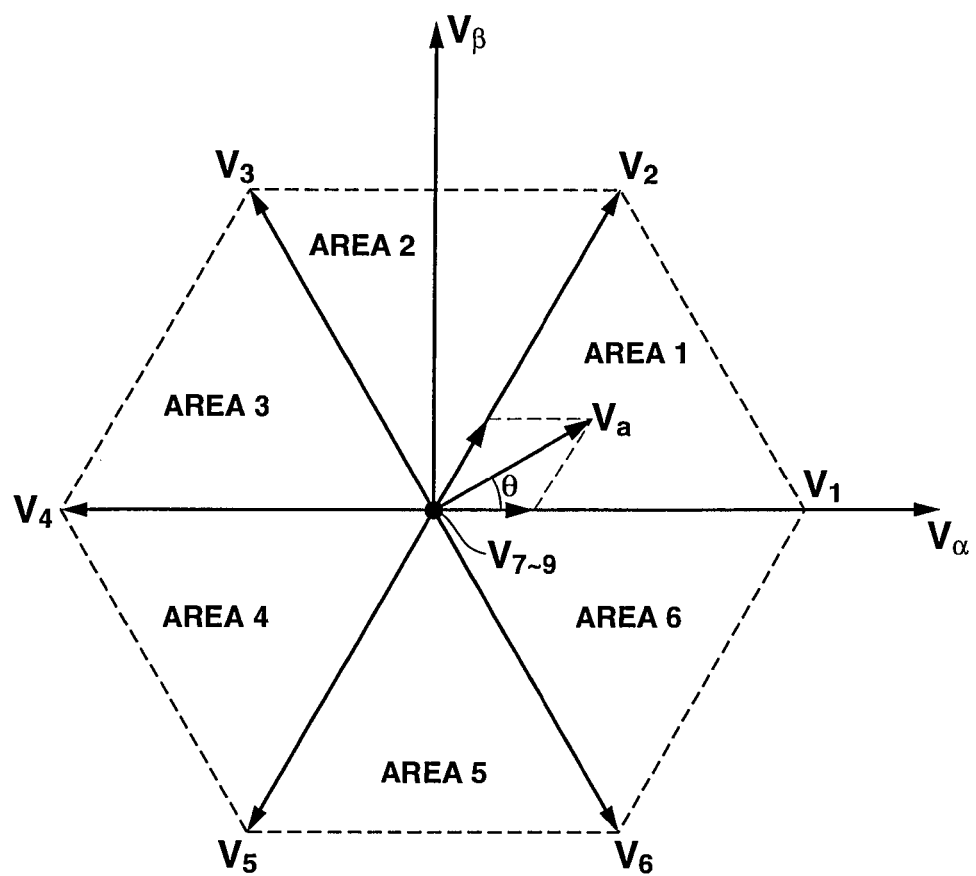
FIG. 6 is a diagram representing a relationship between a base vector and a voltage vector in a space vector modulating section shown in FIG. 4.

When the voltage $(V_\alpha, V_\beta)$ in the static coordinates system coordinates transformed and calculated by coordinates transforming section 11 is inputted to space vector modulating section 12, space vector modulating section 12 calculates phase angle ($\theta$) of voltage $(v_\alpha, v_\beta)$ from the inputted voltage $(v_\alpha, v_\beta)$. It should be noted that the voltage $(v_\alpha, v_\beta)$ and phase angle ($\theta$) are represented by a vector as shown in FIG. 6. FIG. 6 shows a vector diagram in which the detected voltages $(V_r, V_s, V_t)$ are converted into two-phase $\alpha$ $\beta$ coordinates system and the input voltages are observed as voltage vectors in the static coordinates system. $V_a$ in FIG. 6 represents a base vector and corresponds to an output command value having the phase angle ($\theta$) of the input voltage in the $\alpha$ $\beta$ coordinates system. The base vector is rotated with a center point shown in FIG. 6 as a center in accordance with a magnitude relationship among the input voltages of the respective phases.

In this embodiment, in the static coordinates system, the coordinates are divided with 60 degrees into six areas from $\alpha$ axis in the counterclockwise direction. Axes of $V_1$ through $V_6$ are allocated to boundary lines of the respective areas. The area between $V_1$ and $V_2$ is assumed as "area 1", the area between $V_2$ and $V_3$ is assumed as "area 2", the area between $V_3$ and $V_4$ is assumed as "area 3", the area between $V_4$ and $V_5$ is assumed as "area 4", the area between $V_5$ and $V_6$ is assumed as "area 5", and the area between $V_6$ and $V_1$ is assumed as "area 6". In addition, $V_7$ through $V_9$ are allocated to an origin. Then, vectors of $V_1$ through $V_9$ are vectors of voltages outputted from matrix converter 4. Vectors of $V_1$ through $V_6$ having magnitudes as the vectors (not zero) represent that the voltages not zero are outputted from matrix converter 4. That is to say, vectors of $V_1$ through $V_6$ correspond to voltage vectors not zero (hereinafter, referred to as voltage vectors). On the other hand, vectors of $V_7$ through $V_9$ represent vectors of voltage zero (zero voltage) (hereinafter, referred to as zero vectors).

In addition, in this embodiment, voltage vectors $V_1$ through $V_9$ are made correspond to the mutually different switching patterns of switching elements $S_{rp}$, $S_{rn}$, $S_{sp}$, $S_{sn}$, $S_{tp}$, $S_{tn}$ and the switching patterns to operate switching elements $S_{rp}$, $S_{rn}$, $S_{sp}$, $S_{sn}$, $S_{tp}$, $S_{tn}$ are determined dependent upon which area the input voltages belong to. It should be noted that a relationship between voltage vectors $V_1$ through $V_9$ and the switching pattern will be described later.

Then, space vector modulating section 12 determines which area the input voltage at a time point of detection belongs to from the phase angle ($\theta$) of base vector $v_a$. In the example shown in FIG. 6, since base vector va is within area 1, space vector modulating section 12 determines that the input voltage belongs to area 1 from the phase angle (θ) of voltage ($v_\alpha$, $v_\beta$). In addition, for example, in a case where the magnitude relationship of the input voltages ($V_r$, $V_s$, $V_t$) of the respective phases is changed and the phase angle (θ) of α β axis voltages ($v_\alpha$, $v_\beta$) coordinates transformed according to coordinates transforming section 11 indicates 90 degrees, space vector modulating section 12 identifies an area 2 including phase angle of 90 degrees.

Space vector modulating section 12 calculates an output time of the voltage vector from an area axis component of base vector ($V_a$) when the area is identified. In the case of example shown in FIG. 6, base vector ($V_a$) belongs to area 1. Space vector modulating section 12 calculates a component ($V_{a1}$) along $V_1$ axis and a component ($V_{a2}$) along $V_2$ axis using $V_1$ axis and $V_2$ axis which are axes of area 1. Then, the magnitude ($V_{a1}$) of the $V_1$ axis component is the output time of the switching pattern corresponding to $V_1$ and the magnitude ($V_{a2}$) of the $V_2$ axis component is the output time of the switching pattern corresponding to $V_2$. It should, herein, be noted that the output times of voltage vectors $V_1$ through $V_6$ are assumed as $T_1$, $T_2$ and output time of zero vectors ($V_7$ through $V_9$) are assumed as $T_z$. As will be described later, in this embodiment, two voltage vectors are outputted for a half period of a first half of a carrier. Hence, the output time of a first voltage vector from the two voltage vectors is assumed as $T_1$ and the output time of a second voltage vector is assumed as $T_2$.

Each output time ($T_1$, $T_2$, $T_z$) is represented by a normalized time corresponding to the period of the carrier. As will be described later, in this embodiment, in order to secure the output time ($T_z$) of zero vectors ($V_7$ through $V_9$) per half period of the carrier, a limitation is placed on output times ($T_1$, $T_2$, $T_z$). Space vector modulating section 12 calculates output times ($T_1$, $T_2$) such that each of output times ($T_1$, $T_2$) during which the corresponding one of the two voltage vectors is outputted is equal to or below a predetermined lowest limit value. It should be noted that the predetermined lowest limit value corresponds to a time for which output time ($T_z$) is secured and is set to a time shorter than the time corresponding to the half period of the carrier.

Area 1 is a region between the phase angle of 0 degree to 60 degrees. For example, in a case where the phase angle of base vector ($v_a$) falls between 0 degree and 30 degrees, the magnitude ($V_{a1}$) of $V_1$ axis component is larger than magnitude ($V_{a2}$) of the $V_2$ axis component. Hence, output time ($T_1$) of the $V_1$ switching pattern is longer than output time ($T_2$) of the $V_2$ switching pattern. Area 4 is a region between phase angle of 180 degrees and phase angle of 240 degrees. For example, the phase angle of base vector ($v_a$) ranges from 210 degrees to 240 degrees, the magnitude ($V_{a5}$) of the $V_5$ axis component is larger than the magnitude ($V_{a4}$) of the $V_4$ axis component. Hence, output time ($T_2$) of the switching pattern $V_5$ is longer than output time ($T_1$) of the switching pattern of $V_4$. Thus, space vector modulating section 12 calculates the phase angle (θ) using $v_\alpha$, $v_\beta$ corresponding to the detected voltages of the respective phases, calculates output times ($T_1$, $T_2$) of the voltage vectors from the base vector $V_a$ having the calculated phase angle (θ) as the directional component, and outputs the calculated output times ($T_1$, $T_2$) to zero vector time calculating section 13.

Zero vector time calculating section 13 subtracts a total time of output time ($T_1$) and output time ($T_2$) from a predetermined half period of the period of the carrier to calculate the time of zero vector ($T_z$). Since space vector modulating section 12 calculates output time ($T_1$) and output time ($T_2$) such that the above-described total time is equal to or below the predetermined lowest limit time, zero vector time calculating section 13 can calculate the time of zero vector ($T_z$). In this embodiment, in order to provide the alternating current for the output electric power of matrix converter 4, the time at which the non-zero voltage is outputted and the time at which the zero voltage is outputted are periodically provided.

Since the period of the carrier corresponds to the period of the output voltage, the output time ($T_z$) of the zero vector is a subtraction of the output time ($T_1$) and the output time ($T_2$) from the time corresponding to the half period of the carrier. Zero vector time calculating section 13 outputs the time ($T_z$) of the zero vector and the times ($T_1$, $T_2$) of the voltage vectors to a switching signal generating section 15.

Switching signal generating section 15 generates switching signals to drive switching elements $S_{rp}$, $S_{rn}$, $S_{sp}$, $S_{sn}$, $S_{tp}$, $S_{tn}$ using the switching pattern stored in switching pattern table 14, the time of zero vector ($T_1$), and the times ($T_1$, $T_2$) of the voltage vectors.

Before control contents of switching pattern table 14 and switching signal generating section 15 are described in details, the relationship between the vectors of ($V_1$ through $V_9$) and phase angle (θ) and the switching pattern will, hereinbelow, be described using FIGS. 7(a) and 7(b).

Figures 7A, 7B:
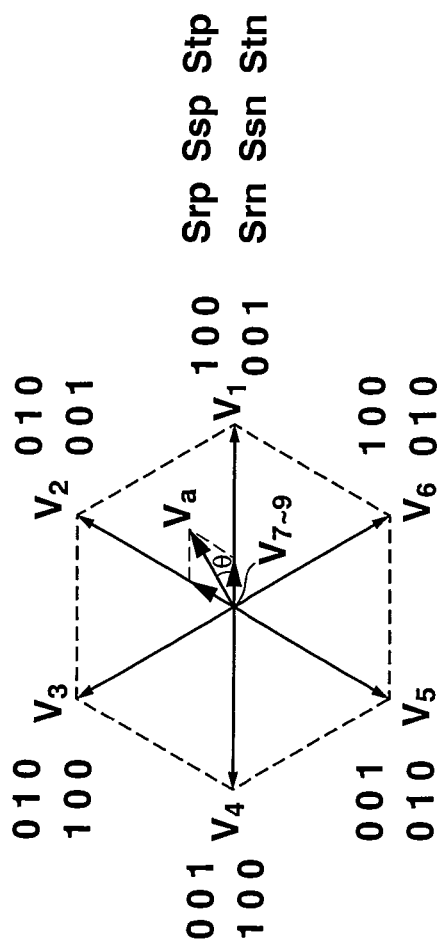
FIG. 7($a$) is a diagram which is an addition of a switching pattern to a vector diagram of FIG. 6 and FIG. 7($b$) is a circuit diagram of an alternating current power supply 1 and a matrix converter 4 in the charging system shown in FIG. 1.

FIG. 7(a) is an explanatory view of the vector diagram of FIG. 6 to which the switching pattern is added. FIG. 7(b) shows a simplified circuit diagram of alternating current power supply 1 and matrix converter 4 from among the charging system in FIG. 1. It should be noted that "1" shown in FIG. 7(a) denotes the on state and "0" denotes the off state.

As shown in FIGS. 7(a) and 7(b), vectors ($V_1$ through $V_9$) correspond to the switching pattern of switching elements $S_{rp}$, $S_{rn}$, $S_{sp}$, $S_{sn}$, $S_{tp}$, $S_{tn}$. In voltage vector ($V_1$), switching elements $S_{rp}$, $S_{tn}$ are turned on and other switching elements $S_{rn}$, $S_{sp}$, $S_{sn}$, $S_{tp}$ are turned off. In voltage vector ($V_2$), switching elements $S_{sp}$, $S_{tn}$ are turned on and other switching elements $S_{rp}$, $S_{rn}$, $S_{sn}$, $S_{tp}$ are turned off. In voltage vector ($V_3$), switching elements $S_{rn}$, $S_{sp}$ are turned on and other switching elements $S_{rp}$, $S_{sp}$, $S_{tp}$, $S_{tn}$ are turned off.

In voltage vector ($V_4$), switching elements $S_{rn}$, $S_{tp}$ are turned on and other switching elements $S_{rp}$, $S_{sp}$, $S_{sn}$, $S_{tn}$ are turned off. In voltage vector ($V_5$), switching elements $S_{sn}$, $S_{tp}$ are turned on and other switching elements $S_{rp}$, $S_{rn}$, $S_{sp}$, $S_{tp}$, $S_{tn}$ are turned off. In voltage vector ($V_5$), switching elements $S_{rp}$, $S_{sn}$ are turned on and other switching elements $S_{rn}$, $S_{sp}$, $S_{tp}$, $S_{tn}$ are turned off.

That is to say, in voltage vectors ($V_1$ through $V_6$), one of switching elements $S_{rp}$, $S_{sp}$, $S_{tp}$ of the upper arm circuit included in one phase from among the respective phases is turned on and other switching elements $S_{rp}$, $S_{sp}$, $S_{tp}$ of the upper arm circuit included in the other phases are turned off, at least one of switching elements $S_{rn}$, $S_{sn}$, $S_{tn}$ of a lower arm circuit included in the other phases is turned on and other switching elements $S_{rn}$, $S_{sn}$, $S_{tn}$ of the lower arm circuit included in the one phase are turned off.

Then, in a case where switching elements $S_{rp}$, $S_{rp}$, $S_{rn}$, $S_{sp}$, $S_{sn}$, $S_{tp}$, $S_{tn}$ are controlled through the switching pattern corresponding to the voltage vectors ($V_1$ through $V_6$), the non-zero voltage is outputted to the output side of matrix converter 4. In addition, since the two vectors which provide boundaries of the two adjacent areas are used in accordance with the areas, waveforms of different voltage levels can be outputted from matrix converter 4.

In addition, in the vector diagrams shown in FIGS. 6, 7(a), and 7(b), the switching pattern is allocated to zero vectors ($V_7$ through $V_9$) shown at an origin of FIG. 7(a). In the vector ($V_7$), switching elements $S_{rp}$, $S_{rn}$ are turned on and other switching elements $S_{sp}$, $S_{sn}$, $S_{tp}$, $S_{tn}$ are turned off. In the vector ($V_8$), switching elements $S_{sp}$, $S_{sn}$ are turned on and other switching elements $S_{rp}$, $S_{rn}$, $S_{tp}$, are turned off. In the vector ($V_9$), switching elements $S_{tp}$, $S_{tn}$ are turned on and other switching elements $S_{rp}$, $S_{rn}$, $S_{sp}$, $S_{sn}$, are turned off.

That is to say, in the zero vectors ($V_7$ through $V_9$), switching elements $S_{rp}$, $S_{rn}$, $S_{sp}$, $S_{sn}$, $S_{tp}$, $S_{tn}$ included in one phase from among the respective phases are turned on and switching elements $S_{rp}$, $S_{rn}$, $S_{sp}$, $S_{sn}$, $S_{tp}$, $S_{tn}$ included in the other phases are turned off.

In a case where switching elements $S_{rp}$, $S_{rn}$, $S_{sp}$, $S_{sn}$, $S_{tp}$, $S_{tn}$ are controlled in the switching pattern corresponding to zero vectors ($V_7$ through $V_9$), the output of matrix converter 4 indicates zero.

As described above, one of the areas is identified according to the phase angle ($\theta$). Then, output voltage vectors ($V_1$ through $V_6$) and output time ($T_1$, $T_2$) are determined. In addition, zero vector time calculating section 13 calculates zero vectors ($V_7$ through $V_9$) and output time ($T_z$) thereof. Since matrix converter 4 is set with the output of the alternating current electric power as an object, reversing and controlling switching elements $S_{rp}$, $S_{rn}$, $S_{sp}$, $S_{sn}$, $S_{tp}$, $S_{tn}$ at a second half of the period of the carrier, for the switching control at a first half of the period of the carrier, so that the output electric power having a reverse polarity to the first half of the period of the carrier can be obtained.

Then, in this embodiment, switching pattern table 14 stores the switching pattern which makes correspondent to the areas of FIG. 6. In addition, switching signal generating section 15 calculates respective output times of vectors ($V_1$ through $V_9$) for the carrier period from the output times ($T_1$, $T_2$) of the voltage vectors and output time ($T_z$) of the zero vectors and generates the switching signals.

Next, the table stored in switching pattern table 14 will be described using FIG. 8. FIG. 8 is a conceptual diagram representing the table stored in switching pattern table 14.

In FIG. 8, areas 1 through 6 corresponds to areas 1 through 6 shown in FIG. 6. $V_1$ through $V_9$ correspond to vectors ($V_1$ through $V_9$). In FIG. 8, $S_{rp}$, $S_{rn}$, $S_{sp}$, $S_{sn}$, $S_{tp}$, $S_{tn}$ correspond to switching elements $S_{rp}$, $S_{rn}$, $S_{sp}$, $S_{sn}$, $S_{tp}$, $S_{tn}$. In addition, for states (1) through (6) in FIG. 8, since one period of the carrier is divided into six when made correspondent to output times ($T_1$, $T_2$, $T_z$), states (1) to (6) are derived in a time series from a summit point section of a valley of the carrier.

In order to output the alternating current from matrix converter 4, matrix pattern table 14 sets the switching pattern such that two voltage vectors and one zero vector are sequentially outputted at the first (former) half period of the period of the carrier and two voltage vectors and one zero vector are sequentially outputted at the second (latter) half period of the period of the carrier.

Figure 9:
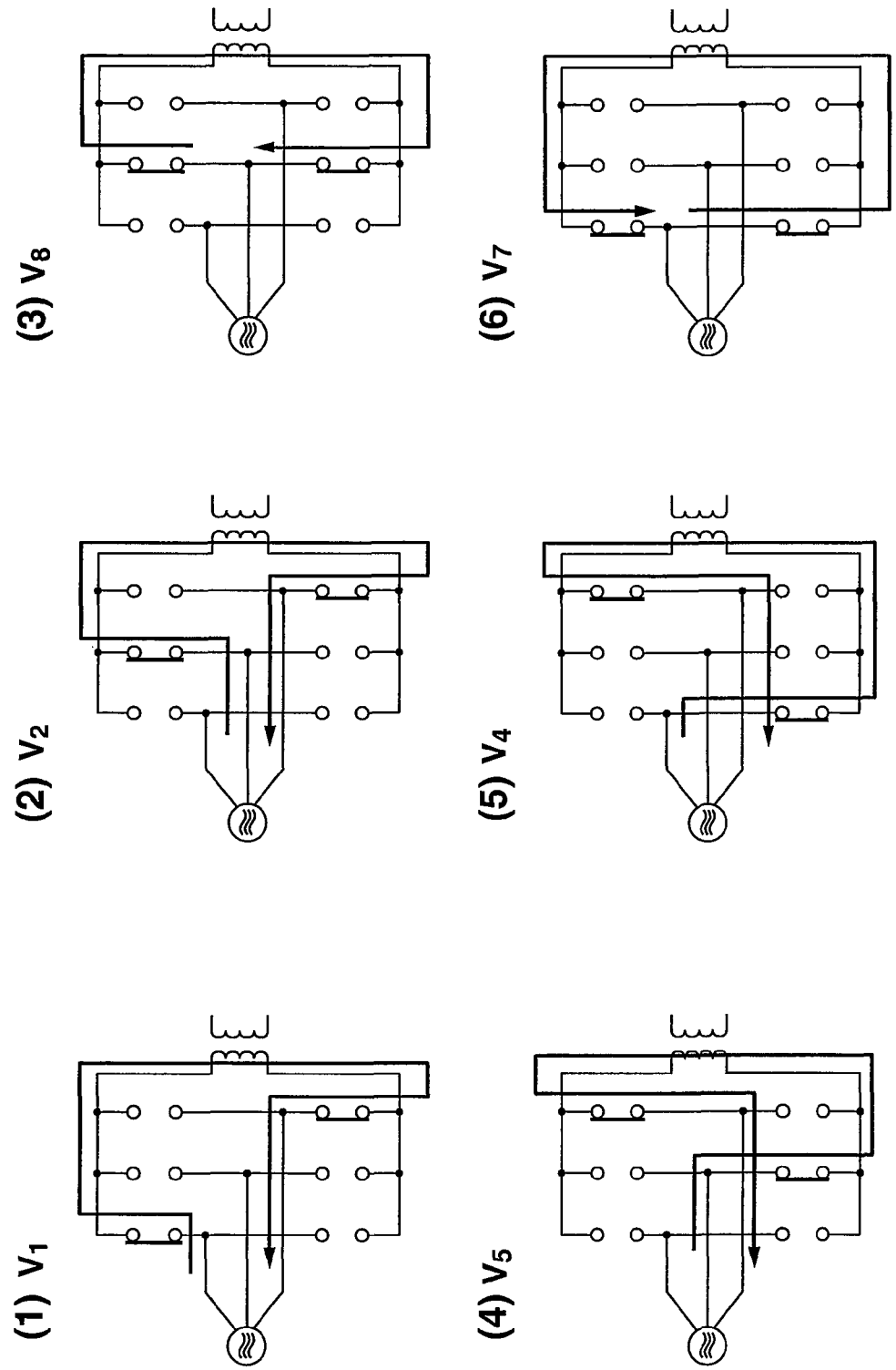
FIGS. 9 (1) through (6) are diagrams for explaining state transitions of the switching elements in FIG. 1.

For example, in a case where base vector ($v_a$) belongs to area 1, switching elements $S_{rp}$, $S_{rn}$, $S_{sp}$, $S_{sn}$, $S_{tp}$, $S_{tn}$ are controlled in a sequence of voltage vector ($V_1$), voltage vector ($V_2$), zero vector ($V_8$), voltage vector ($V_5$), voltage vector ($V_4$), and zero vector ($V_7$) per period of the carrier. The transition of the control of switching elements $S_{rp}$, $S_{rn}$, $S_{sp}$, $S_{sn}$, $S_{tp}$, $S_{tn}$ in area 1 is shown in FIG. 9. FIG. 9 shows a circuit diagram to which the circuit diagram of alternating current power supply 1 and matrix converter 4 is simplified.

The on or off state of respective switching elements $S_{rp}$, $S_{rn}$, $S_{sp}$, $S_{sn}$, $S_{tp}$, $S_{tn}$ in respective states (1) through (6) and the direction flowing through the primary side of transformer 51 are denoted by arrows.

As shown in FIGS. (1) through (6) of FIG. 9, in a case where the transition is made from one state to the subsequent state such as from state (1) to state (2), from state (2) to state (3) and so forth, controller 10 turns on (turns on from the off state) switching elements $S_{rp}$, $S_{rn}$, $S_{sp}$, $S_{sn}$, $S_{tp}$, $S_{tn}$ of either one arm circuit of the upper arm circuit and the lower arm circuit and maintains the on state of switching elements $S_{rp}$, $S_{rn}$, $S_{sp}$, $S_{sn}$, $S_{tp}$, $S_{tn}$ of the other arm circuit. In other words, from among switching elements $S_{rp}$, $S_{rn}$, $S_{sp}$, $S_{sn}$, $S_{tp}$, $S_{tn}$ each of which is in an on state, one of switching elements $S_{rp}$, $S_{rn}$, $S_{sp}$, $S_{sn}$, $S_{tp}$, $S_{tn}$ is turned off but the state of the other of switching elements $S_{rp}$, $S_{rn}$, $S_{sp}$, $S_{sn}$, $S_{tp}$, $S_{tn}$ is maintained (fixed).

In addition, in a case where each state is continuously transited such as states (1), (2), and (3), states (3), (4), and (5), or so forth, switching elements $S_{rp}$, $S_{sp}$, $S_{tp}$, of the upper arm circuit or switching elements $S_{rn}$, $S_{sn}$, $S_{tn}$ of the lower arm circuit are not continuously switched. In other words, switching elements of $S_{rp}$, $S_{rn}$, $S_{sp}$, $S_{sn}$, $S_{tp}$, $S_{tn}$ are alternately switched between the upper arm circuit and the lower arm circuit.

Thus, in this embodiment, number of times the switching of switching elements $S_{rp}$, $S_{rn}$, $S_{sp}$, $S_{sn}$, $S_{tp}$, $S_{tn}$ is carried out when the state is transited among the respective states (1) through (6) is reduced to suppress the commutation failure. It should be noted that the switching pattern of area 1 has been explained but, for the areas of area 2 through area 6, the same switching control is carried out under the same conditions according to the pattern reducing the number of times of the switching is carried out.

It should be noted that, as shown in (1) through (6) of FIG. 9, in states (1) through (3), the output current of matrix converter 4 indicates plus but, in states (4) through (6), the output current of matrix converter 4 indicates minus. Thus, the output of matrix converter 4 indicates the alternating current by controlling switching elements $S_{rp}$, $S_{rn}$, $S_{sp}$, $S_{sn}$, $S_{tp}$, $S_{tn}$ in the switching pattern of area 1 of switching pattern table 14. It should also be noted that, for area 2, area 3, area 4, area 5, and area 6, the switching control in the pattern shown in FIG. 8 is similarly carried out to provide the alternating current for the output of matrix converter 4.

Then, since areas 1 through 6 are classified in accordance with the phase angle, switching pattern table 14 stores the switching pattern corresponding to phase angle ($\theta$).

Next, the control of switching signal generating section 15 will be described using FIG. 10.

Figure 10:
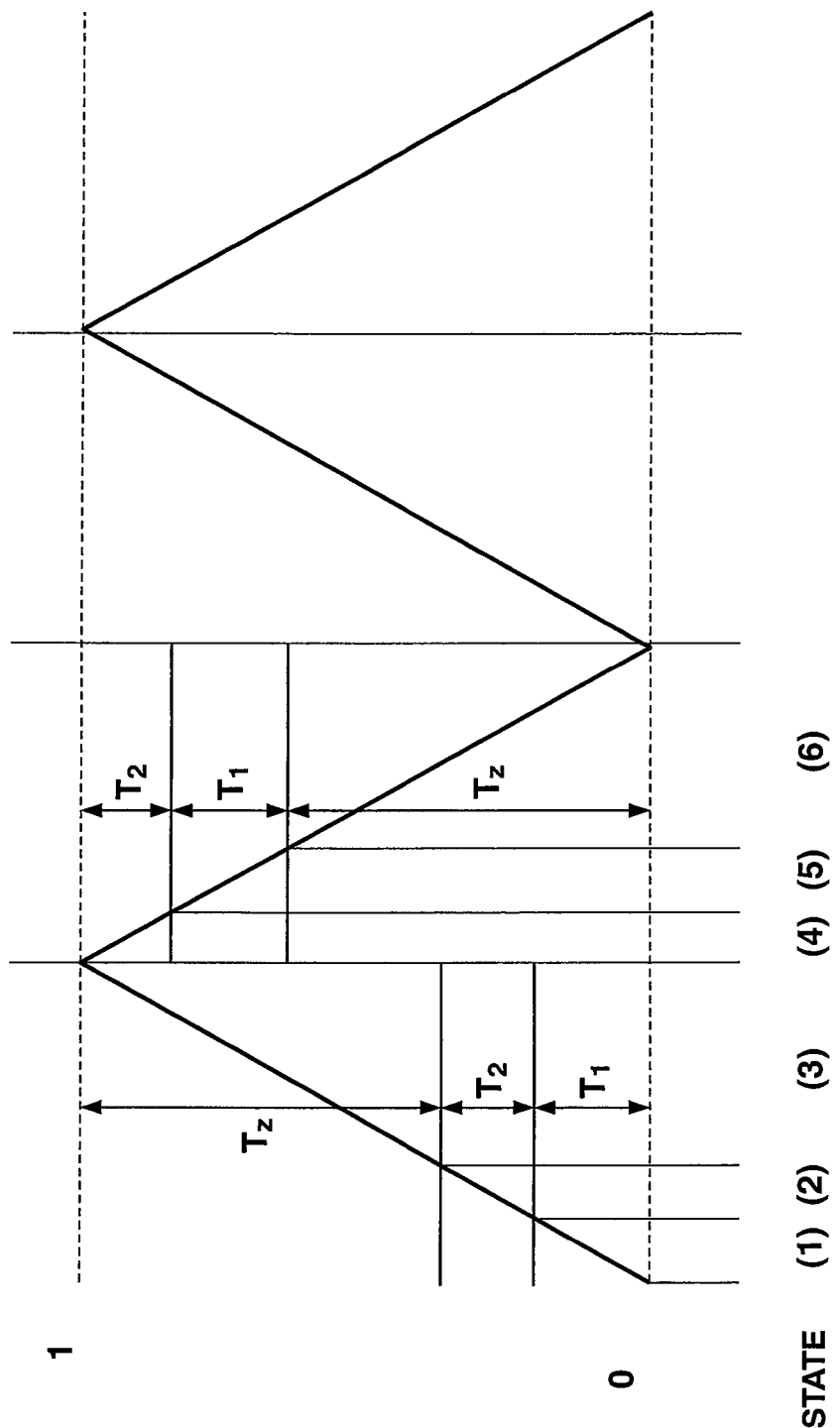
FIG. 10 is a graph representing a relationship between a carrier and an output time in the controller in FIG. 4.

FIG. 10 is a graph for explaining a relationship between the carrier and the output times ($T_1$, $T_2$, $T_z$).

First, switching signal generating section 15 sets command values corresponding to output times ($T_1$, $T_2$) taking a synchronization with the period of the carrier. Since controller 10 performs the switching control through a PWM control method, lengths of the output times ($T_1$, $T_2$, $T_z$) of the voltage vectors and the zero vector indicate the command value (a voltage value).

When the command values are set for the output times ($T_1$, $T_2$, $T_z$), the command values are normalized such that a maximum amplitude of the carrier becomes the output times ($T_1$, $T_2$, $T_z$) for which two voltage vectors and one zero vector are outputted. In addition, for output timings of the voltage vectors and the zero vector, at the first half period of the period of the carrier, the command values are set such that the voltage vectors at the more clockwise side are initially outputted in the respective areas 1 through 6 from among the voltage vectors ($V_1$ through $V_6$) shown in FIG. 6. After the two voltage vectors are outputted, the command values are set such that zero vectors ($V_7$ through $V_9$) are outputted.

On the other hand, the command values are set such that, at the second half period of the carrier, output times of the two vectors ($V_1$ through $V_6$) are reversed from those at the first half period of the period of the carrier and outputted and, thereafter, the zero vectors ($V_7$ through $V_9$) is outputted.

As a specific example, in a case where the phase angle (θ) falls within a range of 0 degree through 30 degrees (area 1), as shown in FIG. 10, switching signal generating section 15 sets the command value ($T_1$) at a level corresponding to the output time ($T_1$) with respect to the low level of the carrier and sets the command value ($T_2$) by adding the level corresponding to the output time ($T_2$) with the command value ($T_1$) as a reference, at the first half period of the carrier. On the other hand, at the second half period of the carrier, switching signal generating section 15 sets the command value ($T_2$) at the level corresponding to output time ($T_2$) lowered from the high level of the carrier and sets the command value ($T_1$) at the level corresponding to the output time ($T_1$) with the command value ($T_2$) as the reference.

Switching signal generating section 15 compares the carrier with the set command values to determine the output timings of the voltage vectors and the zero vector.

In addition, as described above, the command values are set with respect to the output times ($T_1$, $T_2$, $T_z$) and are compared with the carrier so that the six states per period of the carrier are separated. However, the six states correspond to states (1) through (6) shown in FIG. 8.

That is to say, switching signal generating section 15 compares the output times ($T_1$, $T_2$, $T_z$) with the carrier to determine the output timings of the switching pattern stored in switching carrier table 14.

Switching signal generating section 15 compares the carrier with the output times ($T_1$, $T_2$, $T_z$) to determine the output timings as shown in FIG. 10. At this time, switching signal generating section 15 extracts the switching pattern in accordance with the phase angle (θ) from switching pattern table 14, generates the switching signals for switching elements $S_{rp}$, $S_{rn}$, $S_{sp}$, $S_{sn}$, $S_{tp}$, $S_{tn}$ to be driven in accordance with the extracted pattern at the output timings, and outputs the switching signals to switching elements $S_{rp}$, $S_{rn}$, $S_{sp}$, $S_{sn}$, $S_{tp}$, $S_{tn}$.

Specifically, in a case where the phase angle (θ) falls within the range of 0 degree to 30 degrees, the switching pattern of area 1 in FIG. 8 is used. During the output time ($T_1$) with the summit point of the valley of the carrier as a start point, the switching control outputting the voltage vector ($V_1$) is carried out. During the subsequent output time ($T_2$), the switching control to output voltage vector ($V_2$) is carried out. During the further subsequent output time ($T_1$), the switching control to output the zero vector ($V_8$) is carried out. Then, over the second half period of the carrier, during the output time ($T_2$) with a mountain summit of the carrier as the start point, the switching control to output voltage carrier ($V_5$) is carried out. During the subsequent output time ($T_1$), the switching control to output voltage vector ($V_4$) is carried out. During the further output time ($T_1$), the switching control to output the zero vector ($V_7$) is carried out.

The output voltage waveform of matrix converter 4 will be described using FIGS. 11 and 12.

Figure 11:
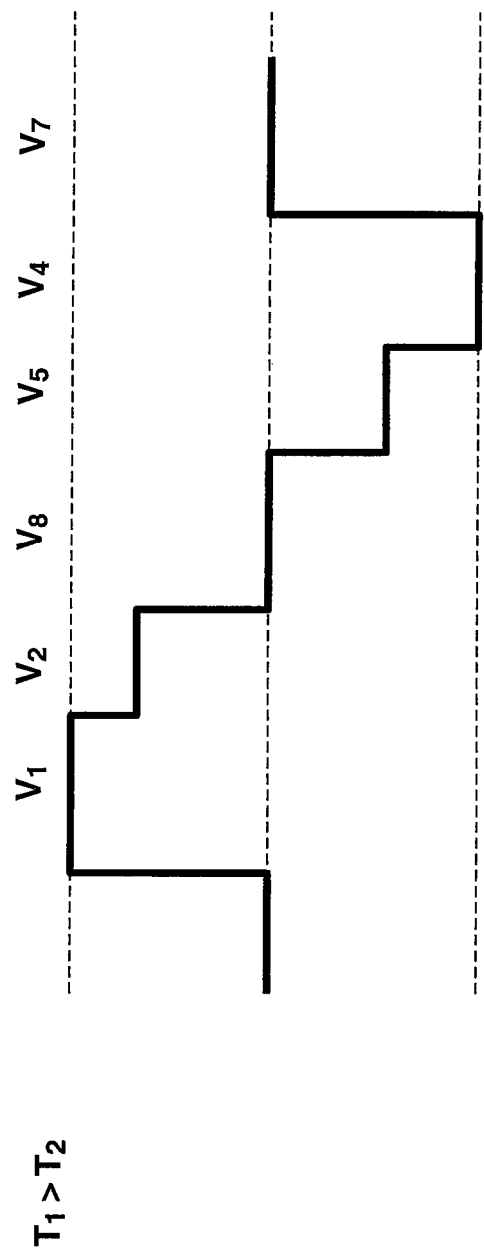
FIG. 11 is a graph representing an output voltage waveform of a matrix converter in FIG. 1.

FIG. 11 shows a time characteristic of the output voltage waveform of matrix converter 4 in a case where the output time ($T_1$) is longer than the output time ($T_2$).

Figure 12:
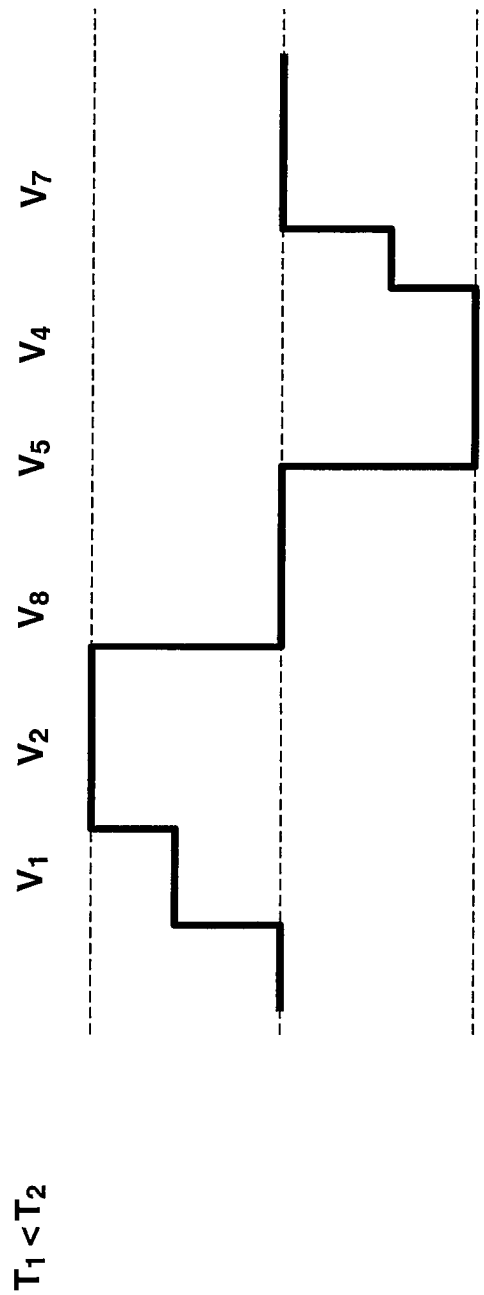
FIG. 12 is a graph representing another output voltage waveform of the matrix converter in FIG. 1.

FIG. 12 shows another time characteristic of the output voltage waveform of matrix converter 4 in a case where output time ($T_2$) is longer than the output time ($T_1$).

In a case where the phase angle (θ) falls in the range of 0 degree to 30 degrees, the output time ($T_1$) becomes longer than the output time ($T_2$). Thus, the voltage waveform outputted from matrix converter 4 is transited as shown in FIG. 12. In addition, in a case where phase angle (θ) is within 30 degrees through 60 degrees, output time ($T_2$) becomes longer than output time ($T_1$) and the output voltage waveform outputted from matrix converter 4 is transited as shown in FIG. 12.

As described above, in this embodiment, switching elements $S_{rp}$, $S_{rn}$, $S_{sp}$, $S_{sn}$, $S_{tp}$, $S_{tn}$ are controlled using the output times ($T_1$, $T_2$) outputting the voltage vectors and the output time ($T_1$) outputting the zero vector to make the output time ($T_1$) included in the first half period of the carrier equal to the output time ($T_1$) included in the second half period of the carrier. As described above, since the output time ($T_1$) of the zero vector is provided, an interval between the switching operation at the initial time point of the output time ($T_x$) of the zero vector and the switching operation at the last time of the output time ($T_1$) is secured so that an overlap between the switching operations at the initial time and the last time is avoided and the commutation failure can be prevented.

Figure 13:
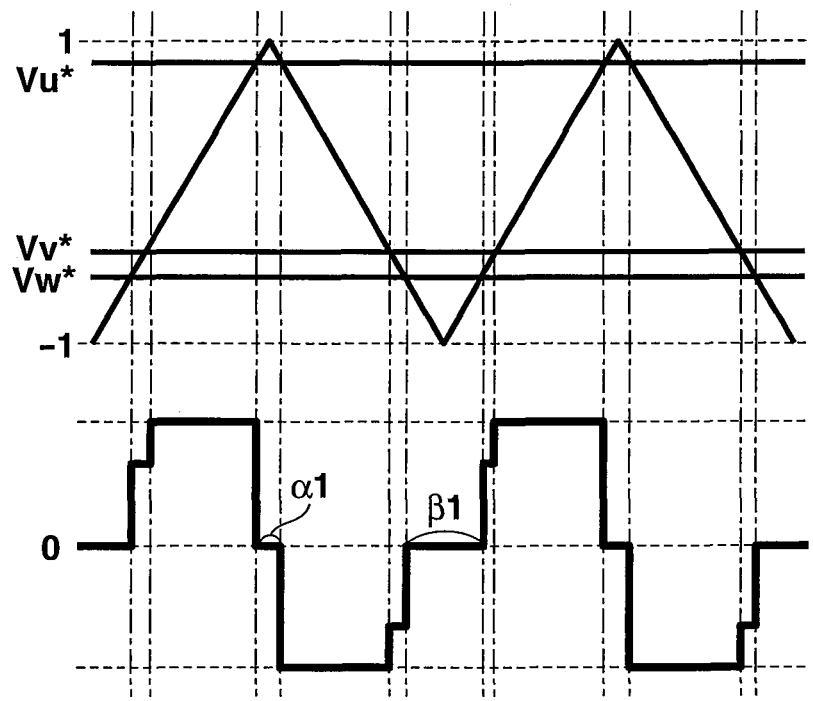
FIG. 13 is graphs representing a relationship between the carrier and a command value and an output voltage waveform in an inverter apparatus in a third comparative example.

Incidentally, as is different from this embodiment, an inverter device (a comparative example 3) in which, in a three-phase inverter circuit formed by a bridge circuit having a plurality of switching elements, with detected voltages of intermediate voltages of the respective phases set as command values ($v_u^*$, $v_v^*$, $v_w^*$), the detected voltages are compared with a triangular wave carrier to control the switching elements is known. FIG. 13 shows waveforms of the carrier and command values ($v_u^*$, $v_v^*$, $v_w^*$) and the waveform of the output voltage of the inverter circuit.

As shown in FIG. 13, comparative example 3 uses a theoretical equation which controls the level of the output voltage when the carrier exceeds the command value and controls so as to reverse the theoretical equation with the mountain and valley of the carrier as boundaries. That is to say, in comparative example 3, the level of the output voltage is set by the comparison of the detected voltages and the carrier and the control of the output of the alternating current is carried out. Hence, zero voltage intervals (corresponds to α1, β1 in FIG. 13) are deviated with respect to the period of the carrier.

Then, since one of the zero voltage intervals (α1 in FIG. 13) becomes relatively short, the interval of the switching operations becomes accordingly short at the first time point of the zero voltage interval and at the last time point of the zero voltage interval. Consequently, the commutation failure occurs.

In addition, in this comparative example 3, the zero voltage interval is not prescribed as a predetermined interval with respect to the period of the carrier. Thus, such a problem occurs that the control of the time during which the zero voltage is outputted becomes complicated.

Since, in this embodiment, the output time ($T_1$) of the zero vector with respect to the period of the carrier is secured, the interval of the switching operations at the initial time point of the zero voltage interval and the last time point of the zero voltage interval is prevented from being shortened and the commutation failure can be prevented.

Figure 14:
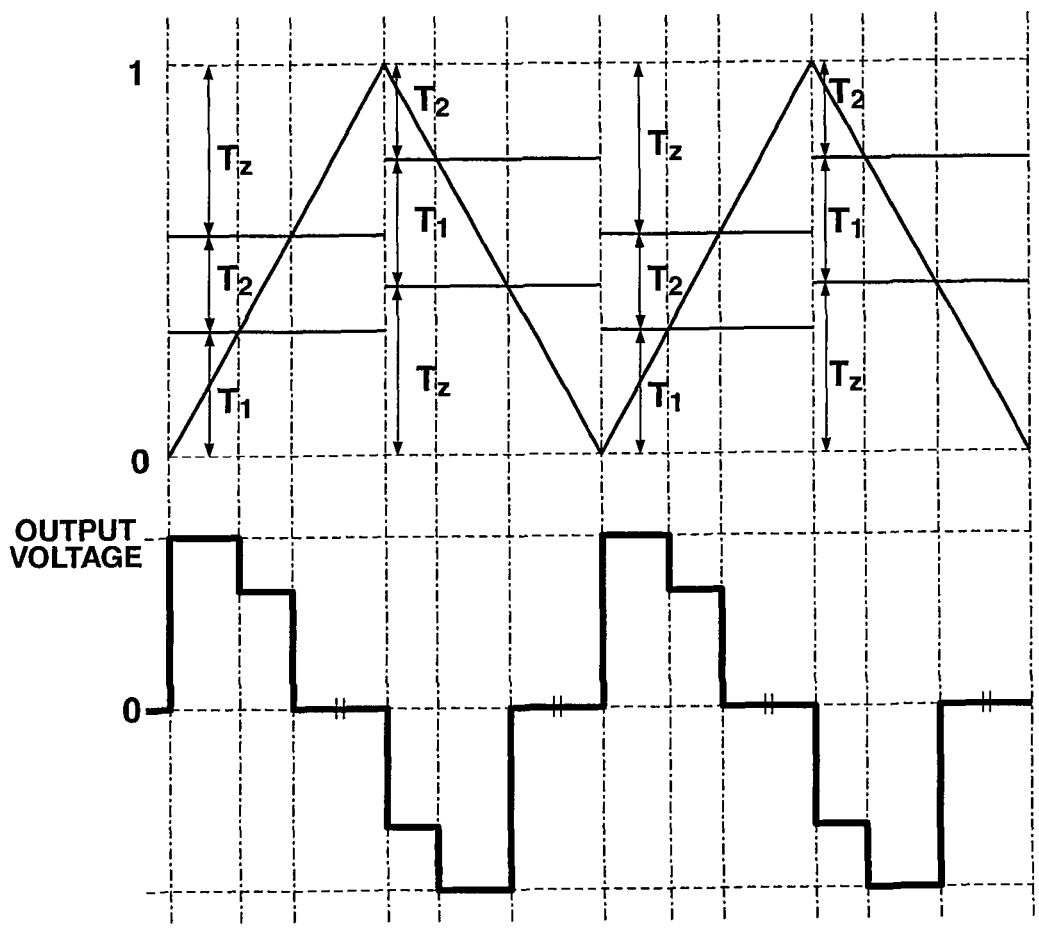
FIG. 14 is graphs representing a relationship between the carrier and the output time and an output voltage waveform, in a controller shown in FIG. 4.

That is to say, as shown in FIG. 14, the output interval of the zero vector is equally allocated for each half period of the carrier. Hence, the output time ($T_x$) of the zero vector is not extremely shortened so that the commutation failure can be prevented from occurring.

In addition, the number of times a short pulse is struck when controlling switching elements $S_{rp}$, $S_{rn}$, $S_{sp}$, $S_{sn}$, $S_{tn}$ can be reduced so that such an inconveniences that a load is concentrated on the switching elements and applied to the switching elements can be prevented. Furthermore, in this embodiment, duties of the switching signals when performing the PWM control and the switching pattern can freely be set. It should be noted that FIG. 14 shows a graph for explaining the relationship between the carrier and the output times ($T_1$, $T_2$, $T_x$) and shows a time characteristic of the output voltage of matrix converter 4.

In addition, in this embodiment, space vector modulating section 12 limits output times ($T_1$, $T_2$) for which the two voltage vectors are outputted to a predetermined lower limit value or lower. Thus, the output time ($T_x$) of the zero vector is secured. Consequently, the commutation failure can be prevented from occurring.

In addition, in this embodiment, the output times ($T_1$, $T_2$, $T_x$) are calculated from the transformed voltages by coordinates transforming section 11, switching pattern table 14 is referred to, and the switching elements ($S_{rp}$, $S_{rn}$, $S_{sp}$, $S_{sn}$, $S_{tp}$, $S_{tn}$) are controlled through the switching pattern corresponding to the converted voltage phase. Thus, since the output time ($T_x$) of the zero vector is secured, the commutation failure can be prevented.

In addition, in this embodiment, the switching elements are controlled through the output time ($T_1$) during which one switching element from among the switching elements included in the upper arm circuit is turned on and one switching element from among the switching elements included in the lower arm circuit is turned on and the output time ($T_2$) during which another switching element from among the switching elements included in the upper arm circuit is turned on and another switching element from among the switching elements included in the lower arm circuit is turned on. Thus, since the output time of the zero vector is secured, the overlap of the switching operations between the first time point of the output time of the zero vector and the last time point thereof can be avoided. Consequently, the commutation failure can be prevented.

In addition, in this embodiment, the output time ($T_1$) is a time before the output time ($T_2$) at the first (initial) half period of the carrier and the output time ($T_1$) is a time after the output time ($T_2$) at the last half period of the carrier. This can achieve an equalization of the output time of the zero vector according to a plus side and a minus side of the output voltage of matrix converter 4.

It should be noted that, in this embodiment, with the summit (point) of the valley of the carrier as the start point, the output times ($T_1$, $T_2$) of the two voltage vectors are first arranged and, subsequently, the output time ($T_z$) of the zero vector is arranged. However, it is not always necessary to arrange the output times in this sequence.

Figure 15:
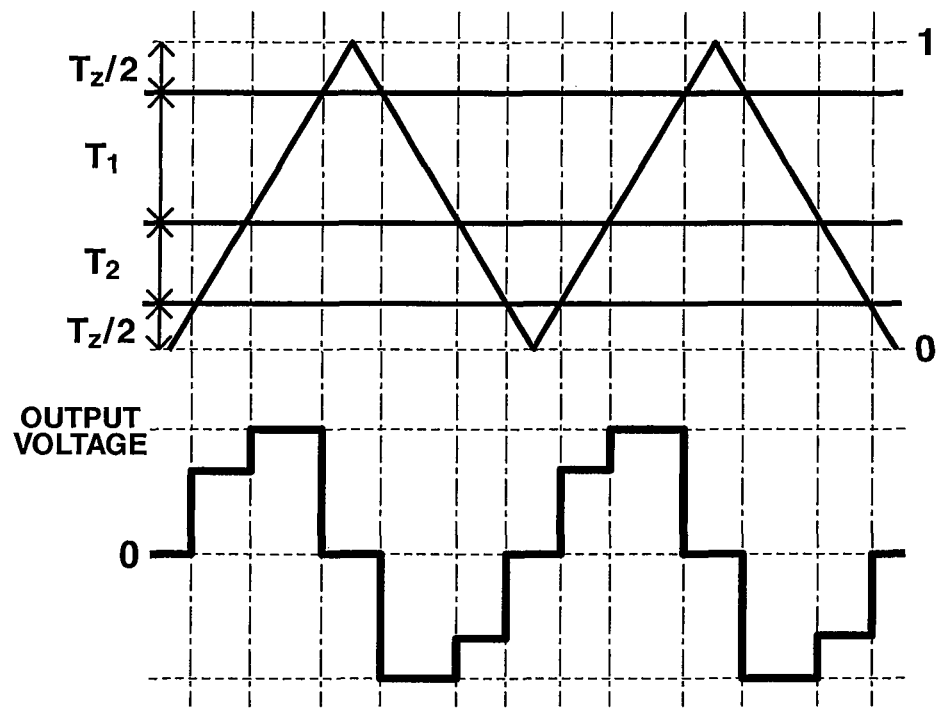
FIG. 15 is graphs representing a relationship between the carrier and the output time and an output voltage waveform in the electric power conversion device in a modification of the preferred embodiment according to the present invention.

For example, as shown in FIG. 15, for the half period of the carrier, the time ($T_z/2$) half of the output time ($T_1$) of the zero vector may be arranged, subsequently, the output times ($T_1$, $T_2$) of the two voltage vectors may be arranged, and, finally, the time ($T_z/2$) half of the remaining output time ($T_1$) may be arranged.

In addition, in this embodiment, the output times ($T_1$, $T_2$) and the output time ($T_1$) are allocated so as to correspond to the half period of the carrier. However, it is not always necessary to correspond to the half period of the carrier. These output times may correspond to be shorter than the half period of the carrier or, alternatively, to be longer than the half period of the carrier.

In addition, a predetermined lower limit time in space vector modulating section 12 is not always a time shorter than the half period of the carrier but may be a time shorter than the time partially corresponding to the period of the carrier.

In addition, in this embodiment, the output times ($T_1$, $T_2$) are controlled to output the two voltage vectors ($V_1$ through $V_6$) per half period of the carrier. The voltage vectors are not always the two voltage vectors ($V_1$ through $V_6$) but may be a single voltage vector ($V_1$ through $V_6$) or, alternatively, three voltage vectors ($V_1$ through $V_6$). In addition, the switching pattern shown in FIG. 8 is merely one example. Another pattern of the voltage vectors and the zero vectors may be replaced and another switching pattern to output the voltage vectors and the zero vectors may be used.

Above-described matrix converter 4 corresponds to a conversion circuit according to the present invention, voltage sensors 31 through 33 correspond to voltage detecting means, controller 10 corresponds to control means, space vector modulating section 12 and zero vector time calculating section 13 correspond to switching time calculating section, switching signal generating section 15 corresponds to a control signal generating section, the output times ($T_1$, $T_2$) correspond to a first switching time, the output time ($T_z$) correspond to a second switching time, switching pattern table 14 corresponds to a table, and coordinates transforming section 11 corresponds to coordinates transforming means.

The invention claimed is:

1. An electric power conversion device, comprising:
    a conversion circuit having plural pairs of bi-directionally switchable switching elements connected to respective phases, the conversion circuit being configured to convert an inputted alternating current electric power into an alternating current electric power;
    voltage detecting means for detecting input voltages to the conversion circuit; and
    control means for switching on and off the switching elements to control the conversion circuit,
    wherein the control means comprises:
    a switching time calculating section configured
        to calculate a first switching time during which one of switching elements of an upper arm circuit of the plural pairs of switching elements included in one phase from among the respective phases is turned on, the other switching elements of the upper arm circuit of the plural pairs of switching elements included in the other phases are turned off, at least one of switching elements of a lower arm circuit of the plural pairs of switching elements included in the other phases is turned on, and the other switching elements of the lower arm circuit of the plural pairs of switching elements included in the one phase are turned off using the detected voltages detected by the voltage detecting means and an output command value and
        to calculate a second switching time during which the plural pairs of switching elements included in the one phase from among the respective phases are turned on and the plural pairs of switching elements included in the other phases from among the respective phases are turned off in a form of a time which is a subtraction of the first switching time from a time corresponding to a half period of a carrier; and
    a control signal generating section configured to generate control signals to switch on and off the switching elements using the first switching time and the second switching time.

2. The electric power conversion device as claimed in claim 1, wherein the control means limits the first switching time to a predetermined time or shorter, the predetermined time being shorter than a time corresponding to a part of a period of the carrier.

3. The electric power conversion device as claimed in claim 1, wherein the control means further comprises:
    a coordinates transforming section configured to perform a rotary coordinates transformation for the detected voltages detected by means of the voltage detecting means; and a table representing a relationship between a phase angle and a switching pattern of the switching elements, the switching time calculating section is configured to calculate the first switching time on a basis of a phase obtained from the voltages transformed by the coordinates transforming section, and the control signal generating section is configured to generate the control signals to switch on and off the switching elements through the switching pattern which is made correspondent to the phase angle of the transformed voltages.

4. An electric power conversion device, comprising:

a conversion circuit having plural pairs of bi-directionally switchable switching elements connected to respective phases, the conversion circuit being configured to convert an inputted alternating current electric power into an alternating current electric power;

a voltage detector configured to detect input voltages to the conversion circuit; and a controller configured to switch on and off the switching elements to control the conversion circuit, wherein the controller comprises:

a switching time calculating section configured
to calculate a first switching time during which one of switching elements of an upper arm circuit of the plural pairs of switching elements included in one phase from among the respective phases is turned on, the other switching elements of the upper arm circuit of the plural pairs of switching elements included in the other phases are turned off, at least one of switching elements of a lower arm circuit of the plural pairs of switching elements included in the other phases is turned on, and the other switching elements of the lower arm circuit of the plural pairs of switching elements included in the one phase are turned off using the detected voltages detected by the voltage detector and an output command value and to calculate a second switching time during which the plural pairs of switching elements included in the one phase from among the respective phases are turned on and the plural pairs of switching elements included in the other phases from among the respective phases are turned off in a form of a time which is a subtraction of the first switching time from a time corresponding to a half period of a carrier; and a control signal generating section configured to generate control signals to switch on and off the switching elements using the first switching time and the second switching time.

* * * * *